WILLIAM FRASIUS.
Improvement in Land-Measuring Registers.
No. 115,186.   Patented May 23, 1871.
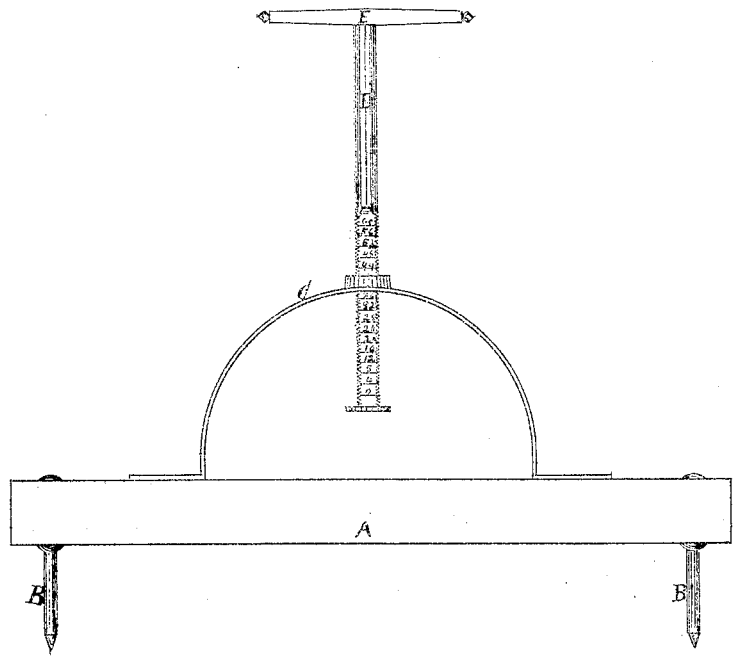

115,186

UNITED STATES PATENT OFFICE.

WILLIAM FRASIUS, OF CHATSWORTH, ILLINOIS.

IMPROVEMENT IN LAND-MEASURING REGISTERS.

Specification forming part of Letters Patent No. 115,186, dated May 23, 1871.

*To all whom it may concern:*

Be it known that I, WILLIAM FRASIUS, of Chatsworth, in the county of Livingston and State of Illinois, have invented a new, useful, and Improved Land-Measuring Apparatus; and I do hereby declare the following to be a full, clear, and exact description thereof, which will enable others skilled in the art to which my invention appertains to make and use the same, reference being had to the accompanying drawing forming part of this specification, in which the figure represents a side elevation of my invention, the separate parts of which are indicated by letters of reference marked thereon.

The object of my invention is to provide an apparatus by the use of which land may be correctly and easily measured; and to that end it consists in a measure having affixed to its lower side and at each end a pivot, so arranged as to alternately enter the ground, thus forming a center upon which the measure may be turned; also, in providing the center and upper side of the measure with an arch-shaped piece of metal, through which is passed a screw-threaded shaft having lines and figures arranged thereon, so that by each revolution of the measure the number thereof is indicated upon the shaft.

In the accompanying drawing, A represents the measure, which may be constructed of metal or wood, or both combined, but preferably of wood. B B' are pivots, which are firmly affixed to the lower side of the measure, and are respectively arranged eight feet and three inches from center to center. C is a metal arch, which is firmly secured to the upper side of the measure, near its center. D is a screw-thread shaft, which is secured vertically within and through the center of said arch, and is so arranged as to admit of a free-and-easy rotating movement. E is the handle, which is firmly affixed to the upper end of the shaft. The said shaft is made flat upon one side, the thread being removed, forming a smooth and plain surface upon which lines and figures are arranged in such a manner as to indicate each revolution of the shaft.

In using my said apparatus the operator holds the handle E firmly in his hand, and places pivot B at the point from which the measurement is to be taken, allowing pivot B' to enter the ground at a point in a line parallel with the line of measurement. He then raises the end of the measure at B, allowing the same to turn upon B', and repeated alternately as often as desired, by which means the number of rods is indicated upon the shaft by the corresponding figures thereon, which figures are brought in line with the upper surface of the arch by the rotation of the same upon the shaft.

Having thus described my invention, what I claim as new, and desire to secure by Letters Patent, is—

The measure A, provided with pivots B B' and arch C, or its equivalent, in combination with shaft D, the whole arranged to operate substantially as and for the purpose described.

The foregoing specification of my invention signed by me this 3d day of March, A. D. 1871.

WILLIAM FRASIUS.

Witnesses:
 N. C. GRIDLEY,
 N. H. SHERBURNE.